US010295081B2

(12) United States Patent
Ji et al.

(10) Patent No.: US 10,295,081 B2
(45) Date of Patent: May 21, 2019

(54) VALVE BODY HAVING PRIMARY AND SECONDARY STEM GUIDES

(71) Applicant: EMERSON PROCESS MANAGEMENT REGULATOR TECHNOLOGIES, INC., McKinney, TX (US)

(72) Inventors: Feifei Ji, Shanghai (CN); Li Li, Shanghai (CN); Jing Chen, Shanghai (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/635,914

(22) Filed: Jun. 28, 2017

(65) Prior Publication Data

US 2018/0259083 A1 Sep. 13, 2018

(30) Foreign Application Priority Data

Mar. 10, 2017 (CN) .......................... 2017 1 0142967
Mar. 10, 2017 (CN) ...................... 2017 2 0232958 U

(51) Int. Cl.
*F16K 39/02* (2006.01)
*F16K 27/07* (2006.01)
(Continued)

(52) U.S. Cl.
CPC ............ *F16K 39/024* (2013.01); *B65D 88/54* (2013.01); *F16K 1/30* (2013.01); *F16K 17/04* (2013.01);
(Continued)

(58) Field of Classification Search
CPC ....... B65D 88/54; F16K 27/07; F16K 39/024; F16K 31/52408; F16K 17/04;
(Continued)

(56) References Cited

U.S. PATENT DOCUMENTS 1,652,510 A    12/1927   Allen
2,226,843 A * 12/1940   Carlson .................. F16K 31/44
                                                                                                                                     251/259
(Continued)

FOREIGN PATENT DOCUMENTS

EP       2 334 965 B1    10/2015
JP       S48-73321 U    9/1973

OTHER PUBLICATIONS

Emerson Process Management, Types C471 and C477 Jet Bleed Internal™ Valves, Bulletin LP-7:C471/C477, 8 pages, Sep. 2012, United States.
(Continued)

*Primary Examiner* — Atif H Chaudry
(74) *Attorney, Agent, or Firm* — Marshall, Gerstein & Borun LLP

(57) ABSTRACT

An internal valve includes a valve stem disposed in a valve body, a poppet valve coupled to the stem, and a bleed valve coupled to the stem. The valve stem is shiftable from a first position in which the poppet valve and the bleed valve are closed, to a second position in which the bleed valve is open, and a third position in which the bleed valve is closed and the poppet valve is open, and the poppet may shift closed in response to a pressure change. A valve body of the internal valve includes primary and secondary stem guides supported by respective primary and secondary stem struts connected to an inner side of the valve body. The valve body further
(Continued)

includes thickened portions extending inwardly toward an axis of the valve body to which the secondary stem struts connect.

21 Claims, 10 Drawing Sheets

(51) Int. Cl.
| | |
|---|---|
| *F16K 17/04* | (2006.01) |
| *F16K 31/122* | (2006.01) |
| *F16K 17/30* | (2006.01) |
| *F16K 27/02* | (2006.01) |
| *B65D 88/54* | (2006.01) |
| *G05D 16/10* | (2006.01) |
| *F16K 31/524* | (2006.01) |
| *F16K 1/30* | (2006.01) |

(52) U.S. Cl.
CPC .............. *F16K 17/30* (2013.01); *F16K 27/02* (2013.01); *F16K 27/0209* (2013.01); *F16K 27/07* (2013.01); *F16K 31/1221* (2013.01); *F16K 31/52408* (2013.01); *G05D 16/103* (2013.01); *Y10T 137/7727* (2015.04); *Y10T 137/8085* (2015.04); *Y10T 137/86348* (2015.04); *Y10T 137/86944* (2015.04); *Y10T 137/86984* (2015.04)

(58) Field of Classification Search
CPC .. F16K 31/1221; F16K 17/30; F16K 27/0209; Y10T 137/8085; Y10T 137/86984; Y10T 137/86348; Y10T 137/86944; Y10T 137/7727
See application file for complete search history.

(56) References Cited

U.S. PATENT DOCUMENTS

| | | | | |
|---|---|---|---|---|
| 2,258,230 | A | * | 10/1941 | Warren ................ F16K 1/32 137/242 |
| 2,347,158 | A | | 4/1944 | Spraragen |
| 2,526,346 | A | | 10/1950 | Goldinger |
| 2,630,137 | A | | 3/1953 | Krone et al. |
| 2,904,074 | A | | 9/1959 | Towler |
| 2,926,690 | A | | 3/1960 | Martin |
| 3,144,003 | A | * | 8/1964 | Jacobs ................ A01K 7/06 119/75 |
| 3,199,534 | A | * | 8/1965 | Shaw ................ F16K 27/07 137/565.13 |
| 3,285,288 | A | | 11/1966 | Irwin et al. |
| 3,631,893 | A | | 1/1972 | Seaman et al. |
| 3,631,894 | A | | 1/1972 | Frantz |
| 3,844,312 | A | | 10/1974 | Sumner et al. |
| 5,848,608 | A | | 12/1998 | Ishigaki |
| 8,256,462 | B2 | | 9/2012 | Lin |
| 8,262,057 | B2 | | 9/2012 | Lin et al. |
| 8,353,310 | B2 | | 1/2013 | Lin et al. |
| 8,517,046 | B2 | | 8/2013 | Lin et al. |
| 9,476,518 | B2 | | 10/2016 | Blanchard et al. |
| 2006/0266962 | A1 | | 11/2006 | Kanzaka et al. |
| 2008/0308161 | A1 | | 12/2008 | Lin et al. |
| 2010/0084594 | A1 | * | 4/2010 | Lin ................ F16K 1/126 251/291 |
| 2011/0203685 | A1 | | 8/2011 | Lin et al. |
| 2013/0056666 | A1 | | 3/2013 | Lin et al. |
| 2015/0129791 | A1 | | 5/2015 | Okita et al. |

OTHER PUBLICATIONS

Emerson Process Management, Types C471, C477 and C486 Internal Valves; Types C471, C477 and C486, 16 pages, Oct. 2015, United States.
International Search Report and Written Opinion for Application No. PCT/US2018/018925, dated Jun. 7, 2018.
International Search Report and Written Opinion for Application No. PCT/US2018/018933, dated Jun. 7, 2018.
International Search Report and Written Opinion for Application No. PCT/US2018/018940, dated Jun. 5, 2018.
International Search Report and Written Opinion for Application No. PCT/US2018/019157, dated Jun. 8, 2018.
International Search Report and Written Opinion for Application No. PCT/US2018/019162, dated Jun. 5, 2018.
U.S. Appl. No. 15/636,492, filed Jun. 28, 2017.
U.S. Appl. No. 15/636,507, filed Jun. 28, 2017.
U.S. Appl. No. 15/635,904, filed Jun. 28, 2017.
U.S. Appl. No. 15/635,708, filed Jun. 28, 2017.
U.S. Office Action for U.S. Appl. No. 15/363,492, dated Jan. 3, 2019.
U.S. Office Action for U.S. Appl. No. 15/635,904, dated Feb. 21, 2019.
U.S. Office Action for U.S. Appl. No. 15/636,507, dated Dec. 28, 2018.
U.S. Office Action for U.S. Appl. No. 15/636,507, dated Jan. 24, 2019.

* cited by examiner

VALVE BODY HAVING PRIMARY AND SECONDARY STEM GUIDES

FIELD OF THE INVENTION

The present disclosure generally relates to a valve body for an internal valve, and more specifically, to a valve body having primary and secondary stem guides.

BACKGROUND OF THE INVENTION

Internal valves are used for a variety of commercial and industrial applications to control fluid flow between a fluid storage container and another container, hose, pipeline, etc. In particular, internal valves may protect against discharge of hazardous materials, compressed liquids, and gases such as, for example, propane, butane, and $NH_3$ (anhydrous ammonia), when transferring such material between a first location and a second location. Internal valves employ flow control mechanisms that close in response to a sudden excess flow condition due to, for example, a broken, severed, or otherwise compromised flow path. Such flow control mechanisms are commonly referred to as poppet valves or excess flow valves, which are often used in applications requiring an automatic, safe cutoff of fluid flow in response to potential leaks or spills of potentially dangerous fluids.

The poppet valve typically operates based on a pressure differential across the internal valve. For example, the poppet valve opens when the inlet pressure is approximately equal to the outlet pressure. The internal valve will typically employ a bleed valve to equalize or balance the pressure across the flow control member before opening the main valve. In one example, an internal valve may be used on an inlet or an outlet of a large storage tank and keeps the tank from rupturing from excessive internal tank pressure. The bleed valve allows the tank to vent or bleed the pressurized gas through a bleed flow path and eventually through the poppet valve until the tank pressure drops to an acceptable level before fully opening the valve.

SUMMARY OF THE INVENTION

In accordance with a first exemplary aspect, for a valve body for an internal valve for use with a fluid container, the fluid container having an opening surrounded by a mounting flange, the valve body may include an upper portion having a diameter and sized to extend through the opening in the fluid container. The valve body may include an inlet and an outlet. The valve body may include a flange arranged to permit the valve body to be mounted to the mounting flange of the container via flange fasteners. The valve body may include a primary stem guide supported by primary stem struts connected to an inner side of the valve body at a first axial location along an axis of the valve body. The valve body may include a secondary stem guide supported by secondary stem struts connected to the inner side of the valve body at a second axial location along the axis of the valve body that is an axial distance from the first axial location. The valve body may further include thickened portions extending inwardly toward the axis of the valve body, each of the secondary stem struts connected to one of the thickened portions.

In accordance with a second exemplary aspect, for an internal valve for connection to a fluid container, the fluid container having an opening surrounded by a mounting flange, the internal valve may include a valve body having an upper portion having a diameter and sized to extend through the opening in the fluid container. The valve body may include an inlet and an outlet. The valve body may include a flange arranged to permit the valve body to be mounted to the mounting flange of the container via flange fasteners. The internal valve may include a valve stem slidably disposed in the valve body. The internal valve may include a primary stem guide supported by primary stem struts connected to an inner side of the valve body at a first axial location along an axis of the valve body, and a secondary stem guide supported by secondary stem struts connected to the inner side of the valve body at a second axial location along the axis of the valve body that is an axial distance from the first axial location. The internal valve may include a poppet valve including a poppet body, the poppet body operatively coupled to the valve stem by a first spring and including a poppet inlet and a poppet outlet, the poppet valve arranged to open and close the inlet of the valve body. The internal valve may include a bleed valve operatively coupled to the valve stem and arranged to open and close the poppet inlet. The valve body may further include thickened portions extending inwardly toward the axis of the valve body, each of the secondary stem struts connected to one of the thickened portions.

In further accordance with any one or more of the foregoing first and second aspects, the internal valve assembly and/or internal valve may further include any one or more of the following preferred forms.

In a preferred form, the thickened portions may curve in a convex shape toward the axis of the valve body.

In a preferred form, the secondary stem guide may be supported by a pair of secondary stem struts, the secondary stem struts may be arranged on opposite sides of the secondary stem guide, and the secondary stem struts may be inclined.

In a preferred form, the secondary stem struts may incline upward from the second axial location.

In a preferred form, the secondary stem struts may incline downward from the second axial location.

In a preferred form, an outer side of the valve body may include at least one mounting area for mounting a strainer.

In a preferred form, each mounting area may include a recessed portion and at least one threaded hole, and the at least one threaded hole may extend into one of the thickened portions.

In a preferred form, the diameter of the upper portion of the valve body may be smaller than the diameter of the opening of the fluid container thereby forming a clearance space between the upper portion and the opening of the fluid container, the clearance space may have a width relative to the upper portion of the valve body and the opening of the fluid container, and the at least one threaded hole may have a depth that is greater than the width of the clearance space.

In a preferred form, the depth of the threaded hole may be at least four times greater than the width of the clearance space.

In a preferred form, the diameter of the upper portion of the valve body may be smaller than the diameter of the opening of the fluid container thereby forming a clearance space between the upper portion and the opening of the fluid container, the clearance space may have a width relative to the upper portion of the valve body and the opening of the fluid container, the at least one threaded hole may have a depth that is greater than the width of the clearance, and the internal valve may include a strainer sized to surround at least a portion of the poppet valve and the bleed valve, the strainer including an extended portion sized to be positioned in the clearance space and arranged for securement to one of the at least one mounting area by at least one fastener.

In a preferred form, each of the at least one fastener may have a length, and the length of each of the at least one fastener may be greater than the width of the clearance space.

In a preferred form, the length of the at least one fastener may be at least four times greater than the width of the clearance space.

DETAILED DESCRIPTION OF THE INVENTION

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

Figure 1:
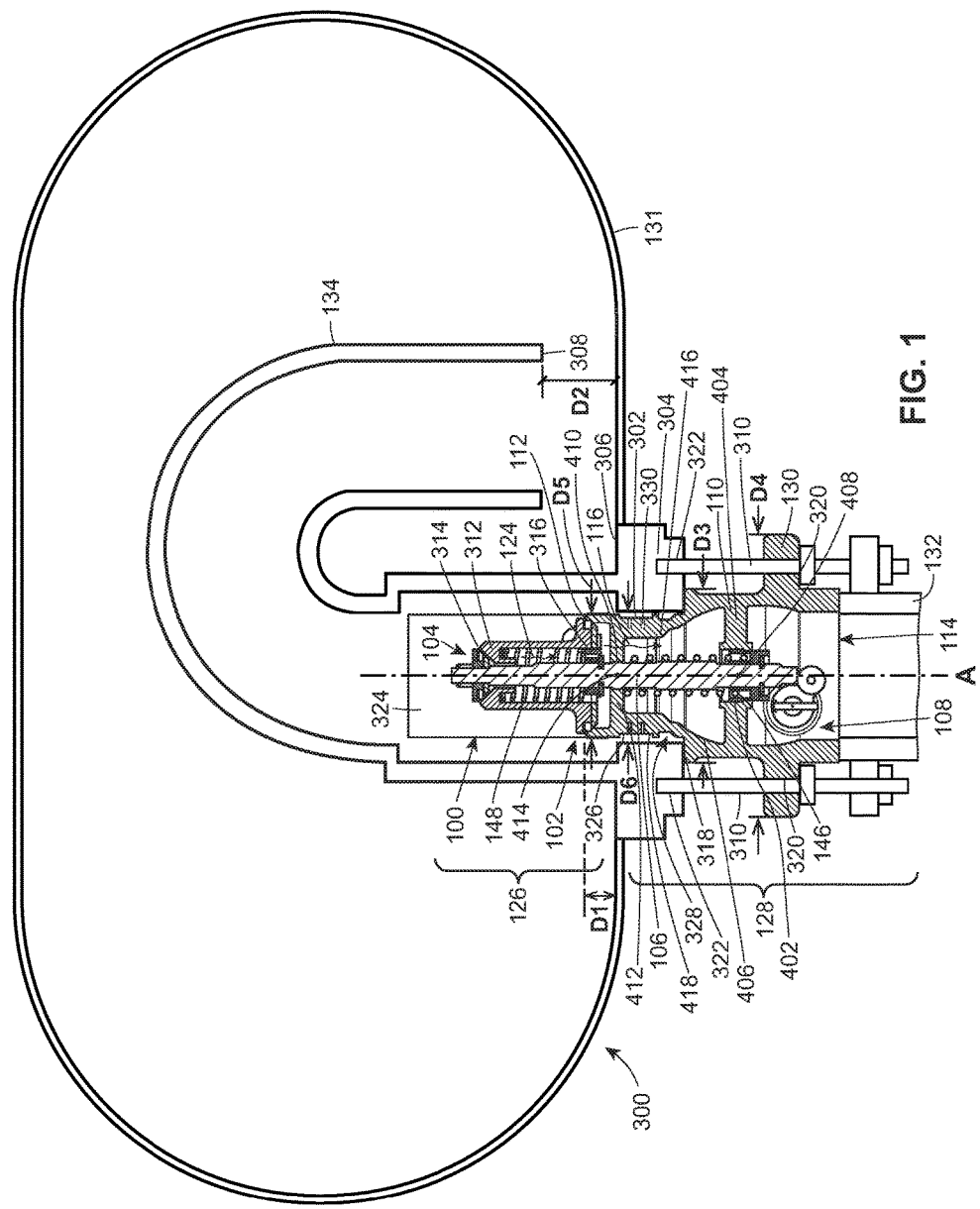
FIG. 1 is a system diagram in cross-section and showing an internal valve constructed in accordance with the teachings of a first disclosed example of the present invention and having a valve body having primary and secondary stem guides and showing the internal valve attached to a fluid container and operatively coupling the fluid container to a pipeline.
Figure 2:
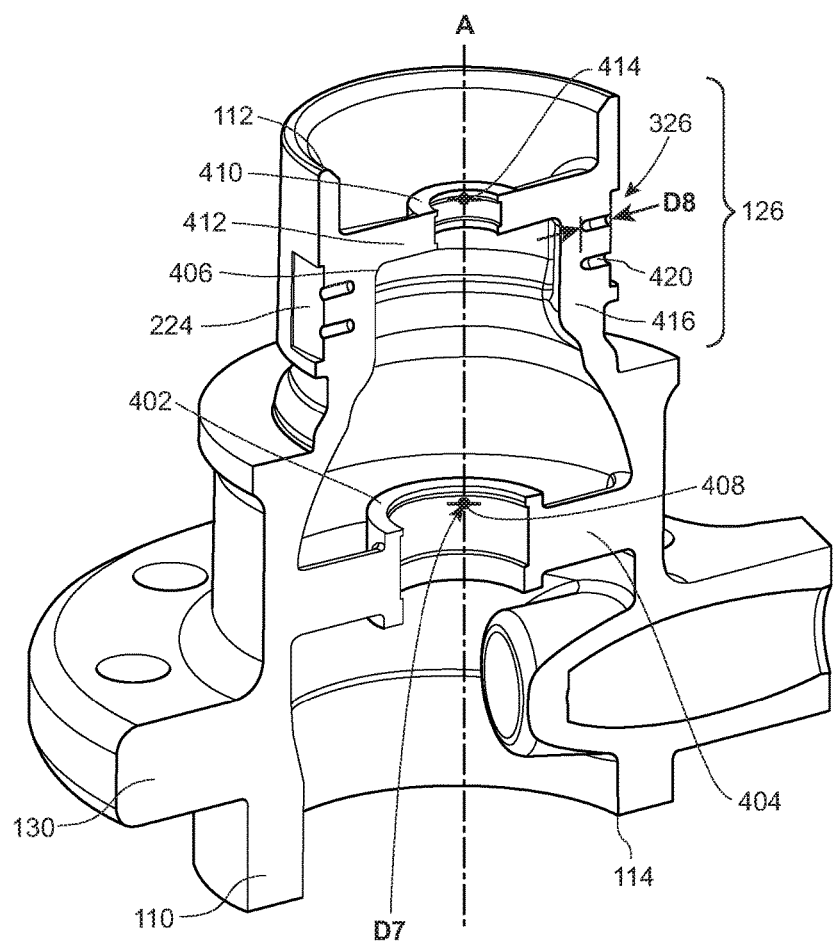
FIG. 2 is a longitudinal cross-sectional view of the valve body of the internal valve of FIG. 1 illustrating the primary and secondary guides and the respective primary and secondary stem struts that support the primary and secondary guides.

FIG. 1 illustrates a valve body 110 for an internal valve 100 for use with a fluid container 131. The fluid container 131 has an opening 302 surrounded by a mounting flange 304. The valve body 110 has an upper portion 126 having a diameter D1 and sized to extend through the opening 302 in the fluid container 131. The valve body 110 also has an inlet 112, an outlet 114, and a flange 130 to permit the valve body 110 to be mounted to the mounting flange 304 of the container via flange fasteners 310. As better shown in FIG. 2, the valve body 110 also includes a primary stem guide 402 supported by primary stem struts 404 connected to an inner side 406 of the valve body 110 at a first axial location 408 along an axis A of the valve body 110, and a secondary stem guide 410 supported by secondary stem struts 412 connected to the inner side 406 of the valve body 110 at a second axial location 414 along the axis A of the valve body that is an axial distance D7 from the first axial location. As also shown in FIG. 2, the valve body 110 further includes thickened portions 416 extending inwardly toward the axis A of the valve body 110, each of the secondary stem struts 412 connected to one of the thickened portions 416.

FIG. 1 further illustrates an example internal valve system 300 comprising an outlet pipe 132, the fluid container 131, and the internal valve 100. The fluid container 131 may further include an inner wall 306, and a feed inlet 308 of a conduit 134, with the feed inlet 308 being spaced a first distance D1 away from the inner wall 306. The internal valve 100, also referred herein as an internal valve assembly, includes a poppet valve 102, a bleed valve 104, a valve stem 106, an actuator 108, as well as the valve body 110. The valve body 110 defines a main fluid flow path 116 between the inlet 112 and the outlet 114.

The valve stem 106 is slidably disposed in the valve body 110. The poppet valve 102 is arranged to open and close the inlet 112 of the valve body 110 based on a pressure and/or a fluid flow rate of a system in which the internal valve 100 is coupled or installed. The poppet valve 102 includes a poppet body 312, which is operatively coupled to the valve stem 106 by a second spring 146. The poppet body 312 includes a poppet inlet 314 and a poppet outlet 316. In high pressure environments, it may be necessary to equalize the pressure between an upstream fluid source and a downstream fluid source or fluid container before the fluid is pumped through the internal valve 100. Such equalization may be achieved by the bleed valve 104, which is arranged to open and close the poppet inlet 314. The bleed valve 104 includes a bleed valve body 118 having a bleed inlet 120, a bleed outlet 122, and defining a bleed flow path 124 between the bleed inlet 120 and the bleed outlet 122. The valve stem 106 is slidably disposed in the bleed valve body 118 and is operatively coupled to both the bleed valve 104 and to the actuator 108.

An actuator 108 is operatively coupled to the valve stem 106. The actuator 108 is operable to shift the valve stem 106 from a first position in which the poppet valve 102 and the bleed valve 104 are both closed, to a second position in which the bleed valve 104 is open, and a third position in which the bleed valve 104 is closed and the poppet valve 102 is open. When the valve stem 106 is in the third position, in response to a pressure change the poppet valve 102 is arranged to close and the bleed valve 104 is arranged to open.

The internal valve 100 may be installed so that a first or upper portion 126 of the valve 100 is arranged to be in fluid communication with a first or upstream fluid source, e.g., the fluid container 131, at which relatively high pressure process fluid may be introduced. The upper portion 126 is sized to extend through the opening 302 in the fluid container 131. A second or lower portion 128 of the valve 100 is arranged to be in fluid communication with a second or downstream fluid source, e.g., the outlet pipe 132, to which the internal valve 100 provides the process fluid. The valve body 110 includes a flange 130 for mounting the internal valve 100 directly to the mounting flange 304 of the fluid container 131 via flange fasteners 310, and further for mounting the internal valve 100 to the outlet pipe 132, which may be provided in a piping system, a storage tank, a bobtail truck system, or any other suitable fluid distribution system.

The first portion 126 of the internal valve 100, which includes the entire bleed valve 104, may be immersed in or surrounded by relatively high pressure fluid. The second portion 128 may be disposed outside of the fluid container 131 to receive an outlet pipe 132, such as a pipe, a hose, or any other suitable conduit, at the outlet 114 of a valve body 110. The process fluid may flow from the fluid container 131 via a conduit 134, such as a hose, and through the internal valve 100. When the bleed valve 104 is open, the process fluid may flow through the bleed flow path 124 and the main flow path 116, through an outlet 114 of the valve body 110, and to the outlet pipe 132. When the poppet valve 102 is open, the process fluid may flow through the inlet 112, through the main fluid flow path 116, and out the outlet 114 of the valve body 110.

The valve body 110 includes a shoulder 318 arranged for sealing engagement with the mounting flange 304 of the fluid container 131. The shoulder 318 is disposed between the inlet 112 and the flange 130 of the valve body 110. The shoulder 318 is spaced away from the inlet 112 and is arranged on the valve body 110 to place the inlet 112 a second distance D2 away from the inner wall 306 of the fluid container 131 when the internal valve 100 is connected to the fluid container 131. The second distance between the inlet 112 and the inner wall 306 is less than the first distance between the feed inlet 308 of the conduit 134 and the inner wall 306.

The shoulder 318 has a diameter D3 smaller than a diameter D4 of the flange 130 of the valve body 110. As a result, the shoulder 318 does not interfere with the connection between the flange 130 and the mounting flange 304, and the flange 130 of the valve body is arranged to receive a plurality of flange fasteners 310 connectable directly to the mounting flange 304 of the fluid container 131. This direct connection may be achieved a number of ways. In the arrangement depicted in FIG. 1, the direct connection occurs because the flange 130 of the valve body includes a plurality of apertures 320 to receive the plurality of flange fasteners 310, and the plurality of apertures 320 are arranged for registration with mounting apertures 322 in the mounting flange 304 of the fluid container 131. The valve body 110 is arranged for connection to the outlet pipe 132 adjacent the outlet 114 of the valve body 110, and the outlet pipe 132 is also securable to the valve body 110 via the plurality of flange fasteners 310.

As shown in FIG. 1, a strainer 324 is sized to surround at least a portion of the poppet valve 102 and the bleed valve 104. The upper portion 126 of the valve body 110 has a diameter D5 and is sized to extend into the opening 302 to surround at least a portion of the poppet valve 102 and the bleed valve 104. The diameter D5 of the upper portion 126 of the valve body is smaller than a diameter D6 of the opening 302 of the fluid container 131. As a result, a clearance space 422 (shown in FIG. 6) is formed between the upper portion 126 of the valve body 110 and the opening 302 of the fluid container 131. The clearance space 422 has a width w (shown in FIG. 6) relative to the upper portion 126 of the valve body 110 and the opening 302 of the fluid container 131. An outer side 418 of the upper portion 126 of the valve body 110 includes a mounting area 326 for mounting the strainer 324. As best shown in FIG. 2, Each mounting area 326 may include a recessed portion 224 and at least one threaded hole 420. Each threaded hole 420 may extend into one of the thickened portions 416. Each threaded hole 420 may have a depth D8 that is greater than the width w of the clearance space 422 (shown in FIG. 6). The depth D8 of the threaded hole may be at least four times greater than the width of the clearance space 422. The strainer 324 includes an extended portion 328 sized to be positioned in the clearance space 422 and arranged for securement to the mounting area 326 by at least one fastener 330.

Figure 3:
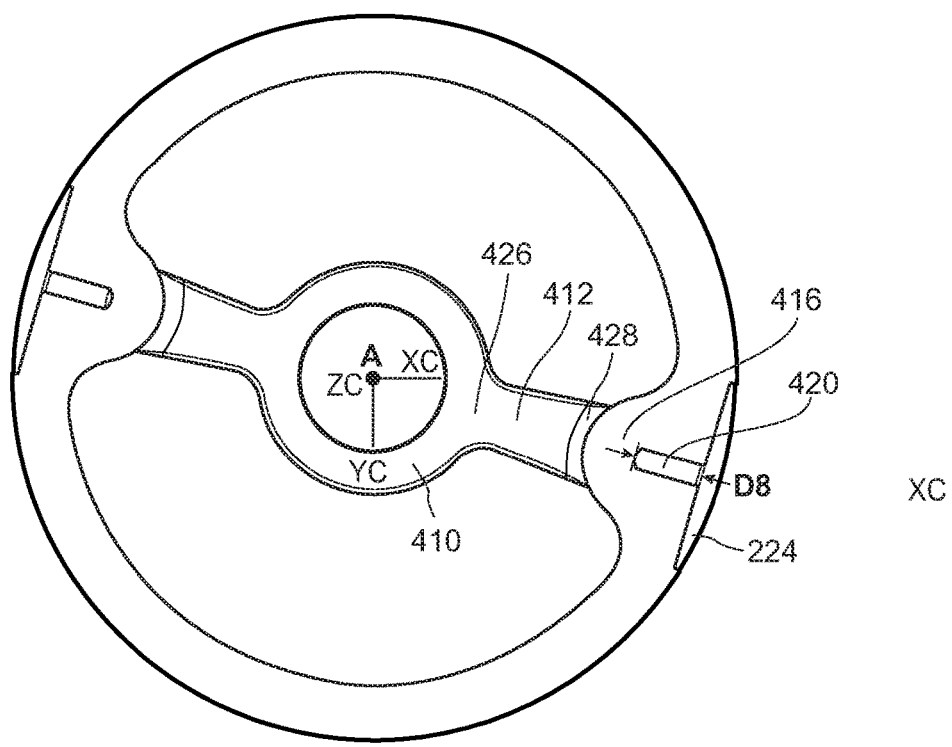
FIG. 3 is a latitudinal cross-sectional view of the valve body of the internal valve of FIG. 1 illustrating thickened portions of the valve body to which the secondary stem struts connect.

Turning to FIG. 2, the thickened portions 416 of the valve body 110 curve in a convex shape toward an axis A of the valve body 110. The secondary stem guide 410 is supported by a pair of secondary stem struts 412. The secondary stem struts 412 are arranged on opposite sides of the secondary stem guide 410. FIG. 3 likewise shows the secondary stem guide 410 being supported by a pair of secondary stem struts 412, which are arranged on opposite sides of the secondary stem guide 410 and connected to thickened portions 416. The secondary struts have an inner end 426 and an outer end 428.

Figure 4:
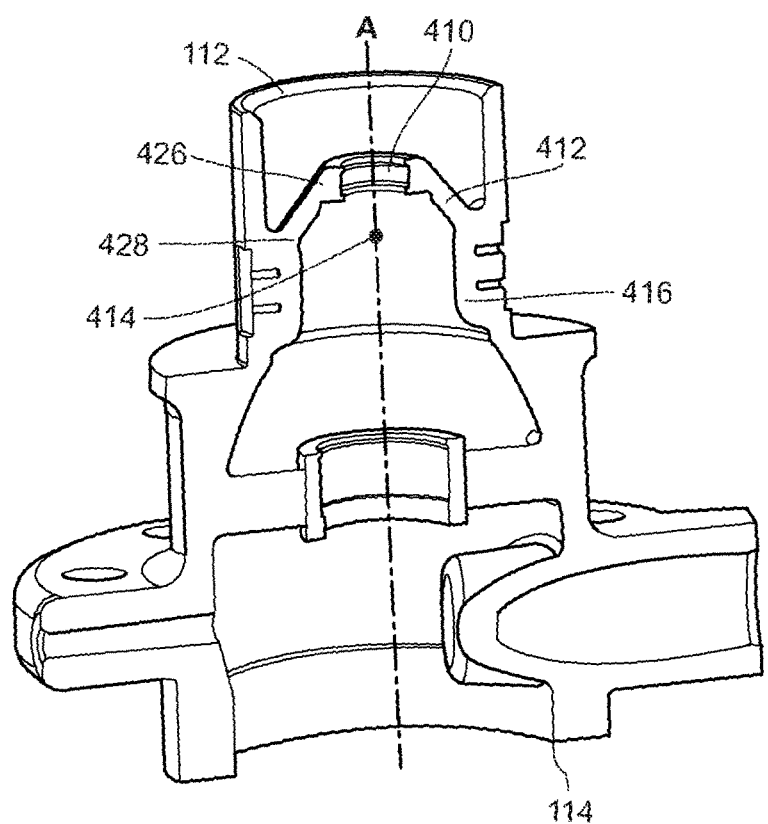
FIG. 4 is a longitudinal cross-sectional view of an alternate arrangement of a valve body in which the secondary stem struts are inclined.

Turning to FIG. 4, the secondary stem struts 412 are inclined. An incline of the secondary stem struts 412 allows increased and smoother flow of fluid through the internal valve 100. In FIG. 4, the secondary stem struts 412 incline upward from the second axial location 414. In other arrangements not depicted, the secondary struts 412 may incline downward from the second axial location 414. For purposes of this disclosure, an incline upward from the second axial location 414 refers to an incline toward the inlet 112 of the valve body 110 and an incline downward from the second axial location 414 refers to an incline toward the outlet 114 of the valve body 110. The inner end 426 and an outer end 428 of the secondary stem struts 412 are placed at different axial locations along the axis A of the valve body 110 when the secondary stem struts 412 are inclined.

Figure 5A:
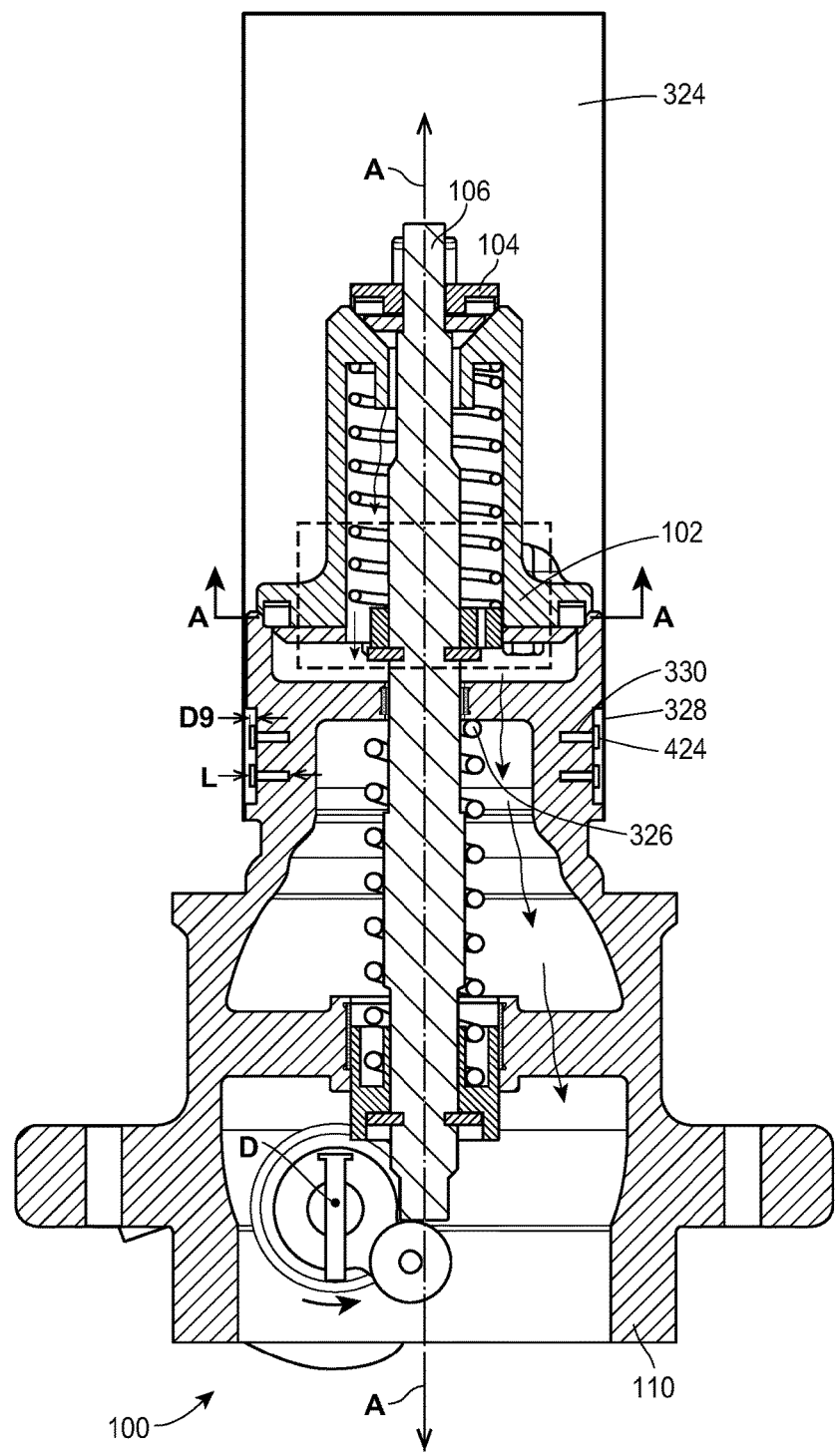
FIG. 5A is a cross-sectional view of the internal valve assembly of FIG. 1 further including a strainer having an extended portion arranged for securement to a mounting area of the valve body by at least one fastener.
Figure 5B:
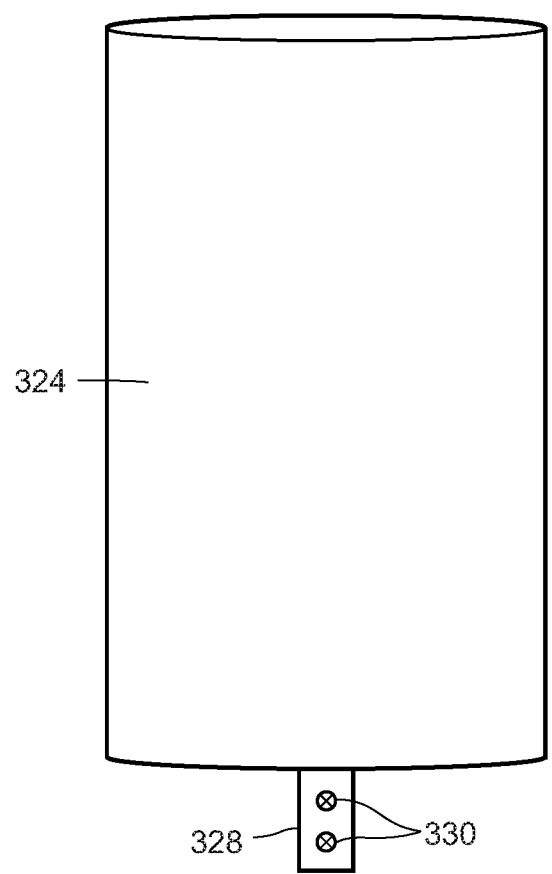
FIG. 5B is a perspective view showing the strainer of FIG. 5A and illustrating the extended portion in greater detail.

Turning to FIG. 5A, the internal valve 100 of the present disclosure is illustrated. In this arrangement, the valve stem 106 includes a first piece 340 and a second piece 342. The poppet body 102 is operatively coupled to the first piece 340 of the valve stem 106, and the bleed valve 104 is operatively coupled to the second piece 342 of the valve stem 106. In this arrangement, the first or excess flow spring 148 is disposed above the valve seat 208 of the bleed valve 104. Further, the valve seat 208 and the valve disc 204 of the bleed valve 104 are disposed below the valve seat 160 and valve disc 168 of the poppet valve 102. A strainer 324 surrounds at least a portion of the poppet valve 102 and the bleed valve 104. An extended portion 328 of the strainer 324 is arranged for securement to a mounting area 326 of the valve body 110 by at least one fastener 330. The fasteners may be screws, nails, or any other fastener common in the art. Each fastener 330 has a length L that is greater than the width w of the clearance space 422 (shown in FIG. 6). The length L may be at least four times greater than the width w of the clearance space 422 (shown in FIG. 6). Each fastener 330 may also have a head 424 having a depth D9 that is less than the width w of the clearance space 422 (shown in FIG. 6). FIG. 5B provides a view of the strainer 324 on its own, showing the extended portion 328 and the fasteners 330.

Figure 6:
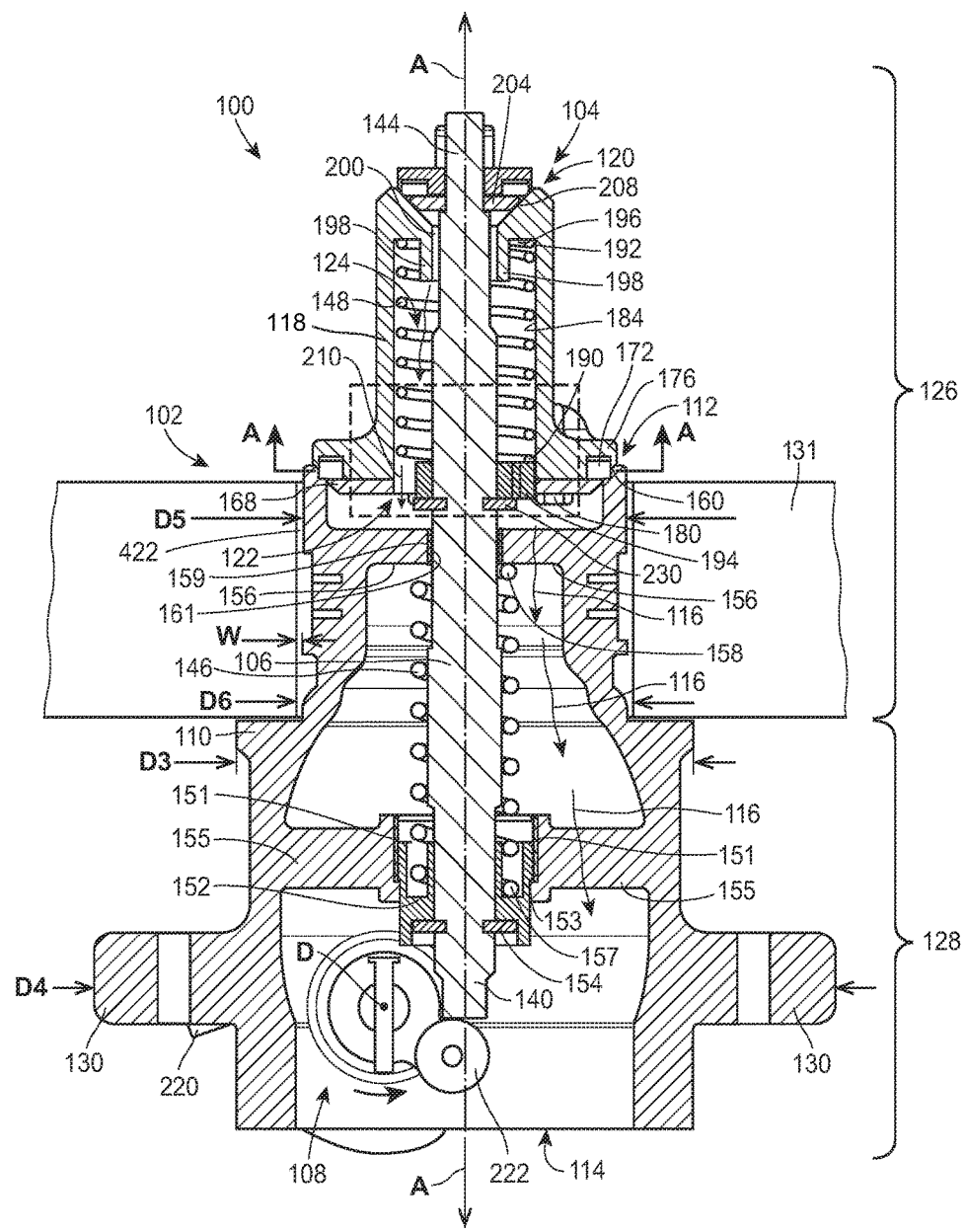
FIG. 6 is an enlarged cross-sectional view showing the internal valve of FIG. 1 in greater detail and illustrating the valve stem of the internal valve in a first position in which a poppet valve and a bleed valve are both closed.

FIG. 6 illustrates additional details about the internal valve 100. The actuator 108 includes a lever 220 coupled to a rotatable cam 222 which rotates the cam 222 about an axis D to engage the bottom end 140 of the valve stem 106 and shift the valve stem 106 in the axial direction. While the actuator 108 in the illustrated example includes the rotatable lever 220 and the cam 222, the internal valve assembly 100 of the present disclosure is not limited to the illustrated actuator arrangement. For example, in other embodiments the actuator 108 may be an automated or manually-operated rotatable or linear drive mechanism arranged to shift the valve stem 106 between the first, second, and third positions. Moreover, another embodiment of the valve 100 may include an additional operating position in which the actuator 108 shifts the valve stem 106 to a position between any two of the first, second, and third positions. In one such additional operating position, both the bleed valve 104 and the poppet valve 102 may be open.

As illustrated in FIG. 6, the poppet valve 102 further includes a valve seat 160 and a valve disc 168. Similarly, the bleed valve 104 includes a valve seat 208, also referred to herein as a bleed seat 208, and a valve disc 204, also referred to herein as a bleed disc 204. In the arrangement of FIG. 6, the valve seat 208 and the valve disc 204 of the bleed valve 104 are disposed above the valve seat 160 and the valve disc 168 of the poppet valve 102 when the valve stem 106 is in the first position. In other arrangements, such as that depicted in FIG. 5A and discussed below, the valve seat 208 and the valve disc 204 of the bleed valve 104 may be disposed below the valve seat 160 and the valve disc 168 of the poppet valve 102.

The function and operation of the internal valve assembly 100 will be described in four sequential operating configurations: a closed configuration shown in FIG. 6, a jet bleed configuration shown in FIG. 7, an open configuration shown in FIG. 8, and a limited bleed configuration shown in FIG. 9. The operating configurations of the valve 100 may be selected by the actuator 108, which is operatively coupled to a bottom end 140 of the valve stem 106. The actuator 108 is operable to shift the valve stem 106 between first, second, and third positions. The valve stem 106 may be shiftable along a longitudinal axis A of the internal valve 100 or along an axis parallel to the longitudinal axis A. When the valve stem 106 is in the first position, both the poppet valve 102 and the bleed valve 104 are closed and the actuator 108 does not engage with or connect with the bottom end 140 of the valve stem 106. A second or closing spring 146 is arranged to bias the internal valve 100 in the closed position. Opposite the bottom end 140, a top end 144 of the valve stem 106 is operatively coupled to the bleed valve 104, enabling the actuator 108 to control the bleed valve 104 by moving the valve stem 106 along the longitudinal axis A. A first or excess flow spring 148 is arranged to bias the poppet valve 102 between the open position and the closed position to respond to fluid pressure changes. As will be explained in further detail below, the first spring 148 is arranged to shift the poppet valve 102 toward the closed position and is arranged to open the bleed valve 104 while the valve stem 106 is in the third position.

The valve body 110 of the internal valve 100 encloses the second spring 146 and a portion of the valve stem 106. The second spring 146 may be a closing spring and is operatively coupled to the valve stem 106 and is arranged to bias the valve stem 106 in a downward direction to close the poppet valve 102 and the bleed valve 104. The second spring 146 provides a downward spring force to the valve stem 106, urging the valve stem 106 to occupy the first position shown in FIG. 6. The second spring 146 is retained between a first spring seat 152 and a first set of inwardly extending portions 156. The inwardly extending portions 156 define a bore 161 in which a bushing 159 is disposed. The bushing 159 guides the stem 106 through the body 110 and facilitates smooth axial movement of the valve stem 106. Further, the valve body 110 defines a seating surface or valve seat 160 at the inlet 112, which leads to an orifice 164 connecting the upstream fluid source to the main fluid flow path 116. When the poppet valve 102 is in the open position, the main fluid flow path 116 is established between the inlet 112 and the outlet 114.

The poppet valve 102 is coupled to the valve body 110 and is operable to open and close the inlet 112 of the valve body 110. The poppet valve 102 is also operatively coupled to the bleed valve body 118. When the poppet valve 102 shifts between an open position to open the inlet 112 and a closed position to close the inlet 112, the bleed valve body 118 moves toward and away from the inlet 112 of the valve body 110. In other words, in the illustrated example of the internal valve 100, the bleed valve body 118 is inherently part of the operation of the poppet valve 102. In the illustrated example, the bleed valve body 118 is depicted as a disc-type valve assembly that includes or carries a valve disc 168 of the poppet valve 102 that engages the valve seat 160 to restrict the flow of fluid through the valve body 110. The poppet valve 102 is shiftable between an open position in FIG. 8 where the valve disc 168 and the bleed valve body 118 are spaced away from the valve seat 160, and a closed position in FIGS. 2, 3, and 5 where the valve disc 168 is seated against the valve seat 160. A disc retainer 172 couples the disc 168 to a disc holder portion 176 of the bleed valve body 118 by one or more fasteners 180.

The bleed valve 104 is coupled to the valve stem 106, and includes the bleed valve body 118 having a bore 184 that houses the first spring 148. The first spring 148 may be an excess flow spring and is arranged to bias the bleed valve body 118 toward the seating surface 160 to restrict the fluid flow through the orifice 164 when the flow rate through the valve 100 exceeds a specified or predetermined flow rate, e.g., an excess flow limit or rate of the valve 100. The first spring 148 includes a bottom end 190 and a top end 192, and is retained between a second spring seat 194 and a retaining shoulder 196, which is defined by the bore 184 and a cylindrical portion 198. The top end 192 of the first spring 148 bears against the retaining shoulder 196 and the bottom end 190 of the first spring 148 bears against the second spring seat 194. The second spring seat 194 is operatively coupled to the valve stem 106 such that the second spring seat 194 moves with the valve stem 106 as the stem 106 shifts in the axial direction along the longitudinal axis A. The spring seat 194 defines at least a portion of a flow aperture 210 disposed in the bleed flow path, which permits fluid communication between the bleed inlet 120 and the bleed outlet 122. A bleed port 200 may be integrally formed with the bleed valve body 118, and in particular, may be defined as the opening formed by the cylindrical portion 198 of the bleed valve body 118. The bleed port 200 is disposed within the bleed flow path 124 and fluidly connects the bleed inlet 120 and the bore 184, and the bore 184 fluidly connects the bleed inlet 120 and the bleed outlet 122. A bleed disc 204 is shiftable between an open bleed position, shown in FIGS. 2 and 4, where the bleed disc 204 is spaced away from a bleed seat 208 and the bleed port 200, and a closed bleed position, shown in FIGS. 1 and 3, where the bleed disc 204 is seated against the bleed seat 208, sealing the bleed port 200 from the upstream fluid source. Taken together, the poppet valve 102 and the bleed valve 104 form the internal valve 100.

Turning now specifically to FIG. 6, the internal valve 100 is in the first or closed operating configuration. In the closed configuration, the poppet valve 102 is in the closed position and the bleed valve 104 is in the closed bleed position such that the outlet 114 is sealed off from the upstream fluid source. The valve disc 168 carried by the bleed valve body 118 is biased toward the closed position by the first spring 148 and/or by the pressure of the upstream fluid source at the inlet 112. The bleed disc 204 of the bleed valve 104 is biased toward the closed bleed position by the second spring 146 via the valve stem 106. When both the poppet valve 102 and the bleed valve 104 are closed, the valve disc 168 engages the valve seat 160 to prevent the flow of fluid through the orifice 164, and the bleed disc 204 engages the bleed seat 208 to prevent the flow of fluid through the bleed port 200.

In FIG. 6, the operating lever 220 of the actuator 108 is in a first position whereby the rotatable cam 222 does not engage the bottom end 140 of the valve stem 106. When, however, the actuator 108 is operated to shift the valve stem 106 in the axial direction along the longitudinal axis A from the position shown in FIG. 6 to the position shown in FIG. 7, the lever 220 is moved to a second position, which causes the cam 222 to rotate about the axis D until the cam 222 engages the bottom end 140 of the valve stem 106. In this example, the second position of the lever 220 corresponds to a midpoint of its travel path positioned 35 degrees relative to the first position. Movement of the valve stem 106 to the position shown in FIG. 7 compresses the second spring 146 between the first spring seat 152 and the valve body 110, causing the bleed disc 204 to move away from the bleed seat 208, thereby moving the internal valve 100 from the closed operating configuration to the jet bleed configuration.

Figure 7:
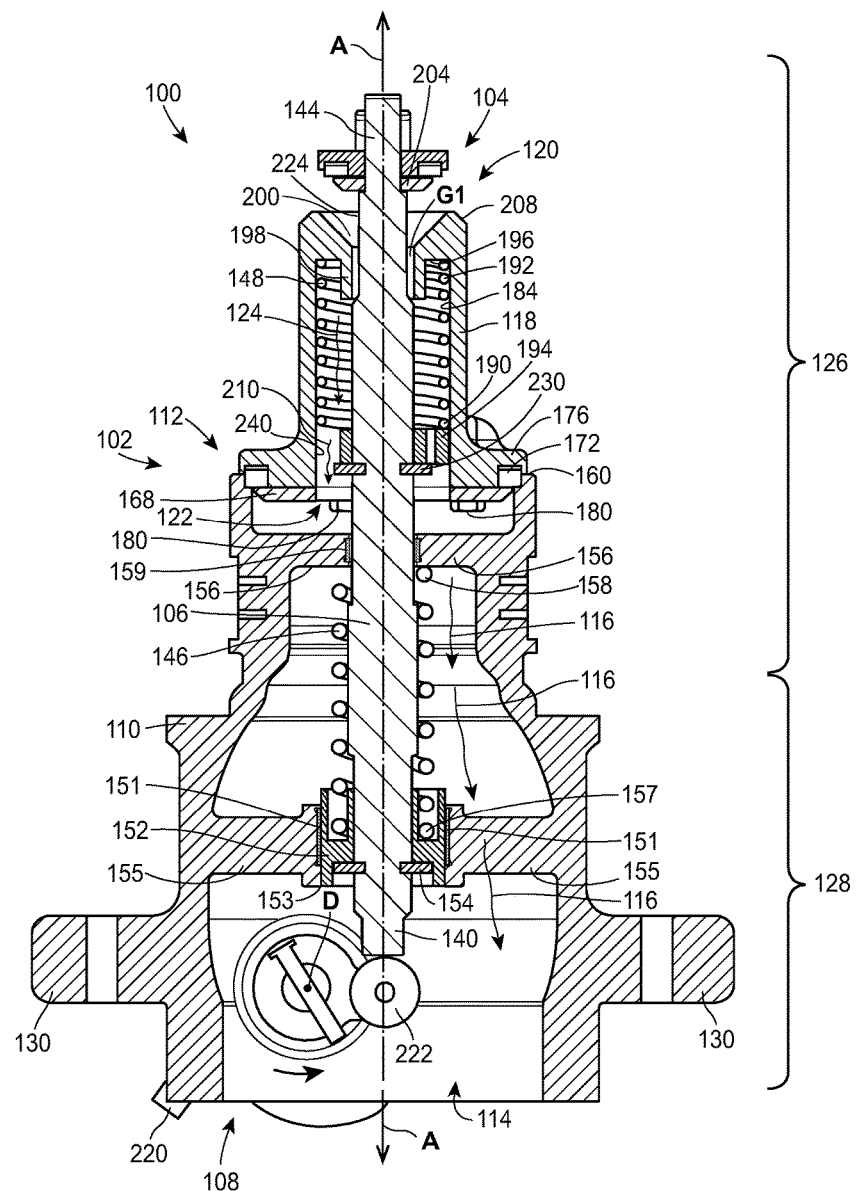
FIG. 7 is a cross-sectional view of the internal valve of FIG. 6 and showing the valve stem in a second position in which the bleed valve is open and the poppet valve is closed.

In the jet bleed configuration of FIG. 7, the valve stem 106 is in the second position and the poppet valve 102 remains closed, but bleed valve 104 is in the open position, thereby permitting fluid from the upstream fluid source to enter the bleed inlet 120 and equalize the pressure differential across the valve 100. A portion of the valve stem 106 that is disposed in the bleed port 200 includes a reduced diameter or a recessed portion 224 to permit fluid flow between the cylindrical portion 198 of the bleed valve body 118 and the valve stem 106. In the jet bleed configuration, the recessed portion 224 forms a gap G1 between the valve stem 106 and the bleed port 200. So configured, the bleed valve 104 may allow for greater fluid flow through the bleed port 200 to the bleed flow path 124, which may result in quicker pressure equalization across the valve 100. The flow aperture 210 formed in the second spring seat 194 fluidly connects the bleed flow path 124 to the inlet 112 of the poppet valve 102, permitting fluid to continuously flow through the valve 100 until the upstream pressure and downstream pressure are nearly equal. The poppet valve 102 remains in the closed position until a pressure of the upstream fluid source is less than the spring force of the first spring 148, causing the first spring 148 to expand and push the bleed valve body 118 upward in the axial direction toward the open position. The gap G1 provided by the placement of the recessed portion 224 of the stem 106 relative to the bleed port 200 together with the flow aperture 210 of the second spring seat 194 may expedite equalization of the internal valve 100.

The second spring 146 and the first spring 148 are compressed while fluid flows from the upstream fluid source through the bleed valve 104 and into the inlet 112 of the poppet valve 102. The first spring seat 152 movably (e.g., slidably) disposed in a guide sleeve 151 (e.g., a bushing) seated in a bore 153 defined by and between a second set of opposed inwardly extending portions 155 of the valve body 110, and is coupled to the valve stem 106 via a retaining feature 154 such that the first spring seat 152 is movably (e.g., slidably) disposed in the body 110 relative to the guide sleeve 151 and the bore 153 of the valve body 110. The first spring seat 152 thus applies a force (in this case, an upward force) against the second spring 146 when the valve stem 106 shifts upward, causing the first spring 146 to compress against the first set of inwardly extending portions 156 of the valve body 110. The second spring seat 194 is operatively coupled to the valve stem 106 via a ring 230, e.g., a clip, and moves further into the bore 184 of the bleed valve 104 as the valve stem 106 shifts upward in the axial direction. The first spring 148 compresses between the retaining shoulder 196 of the bleed valve body 118 and the second spring seat 194. Depicted in FIG. 7, the force exerted by the first spring 148 onto the retaining shoulder 196 and spring seat 194 is not yet sufficient to overcome the force of pressure of the upstream fluid source on the poppet valve 102, and therefore the poppet valve 102 remains in the closed position. In another example, the second spring seat 194 may be coupled to the valve stem 106 by pin extending through the valve stem 106 or by a notch or a groove formed in the surface of the valve stem 106.

When the actuator 108 is operated to shift the valve stem 106 in the axial direction from the second position (FIG. 7) to a third position (FIG. 8), the lever 220 is moved to a third position by completing its travel path, thereby further rotating the cam 222 about the axis D and driving the valve stem 106 further upward. Movement of the valve stem 106 to the position shown in FIG. 8 further compresses the second spring 146 and the first spring 148, which forces the poppet valve 102 to open as the pressure of the upstream fluid source approximately equals the pressure of the downstream fluid source, thereby moving the internal valve 100 from the jet bleed configuration to the open operating configuration.

Figure 8:
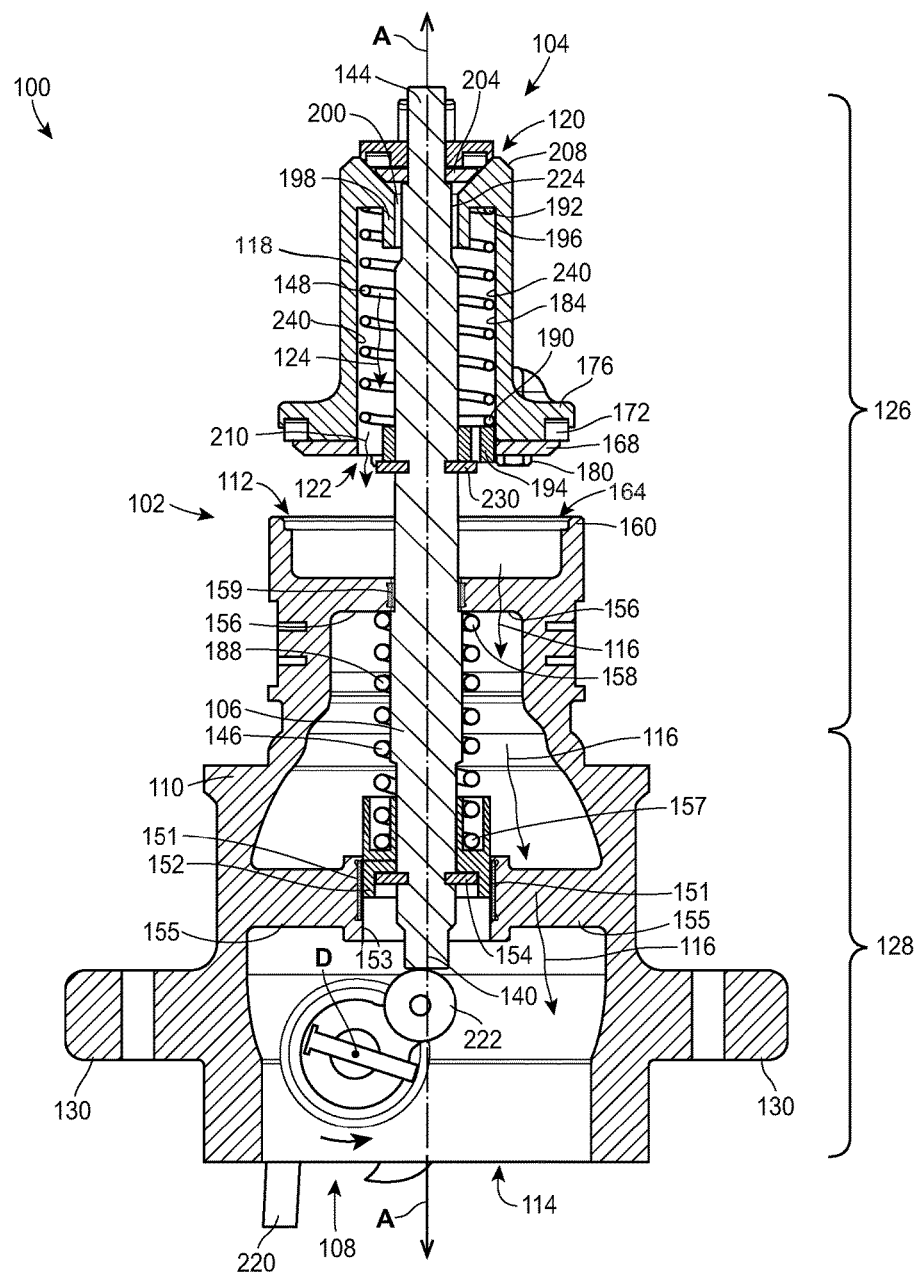
FIG. 8 is a cross-sectional view of the internal valve of FIG. 6 and showing the valve stem in a third position in which the bleed valve closed and the poppet valve is open.
Figure 9:
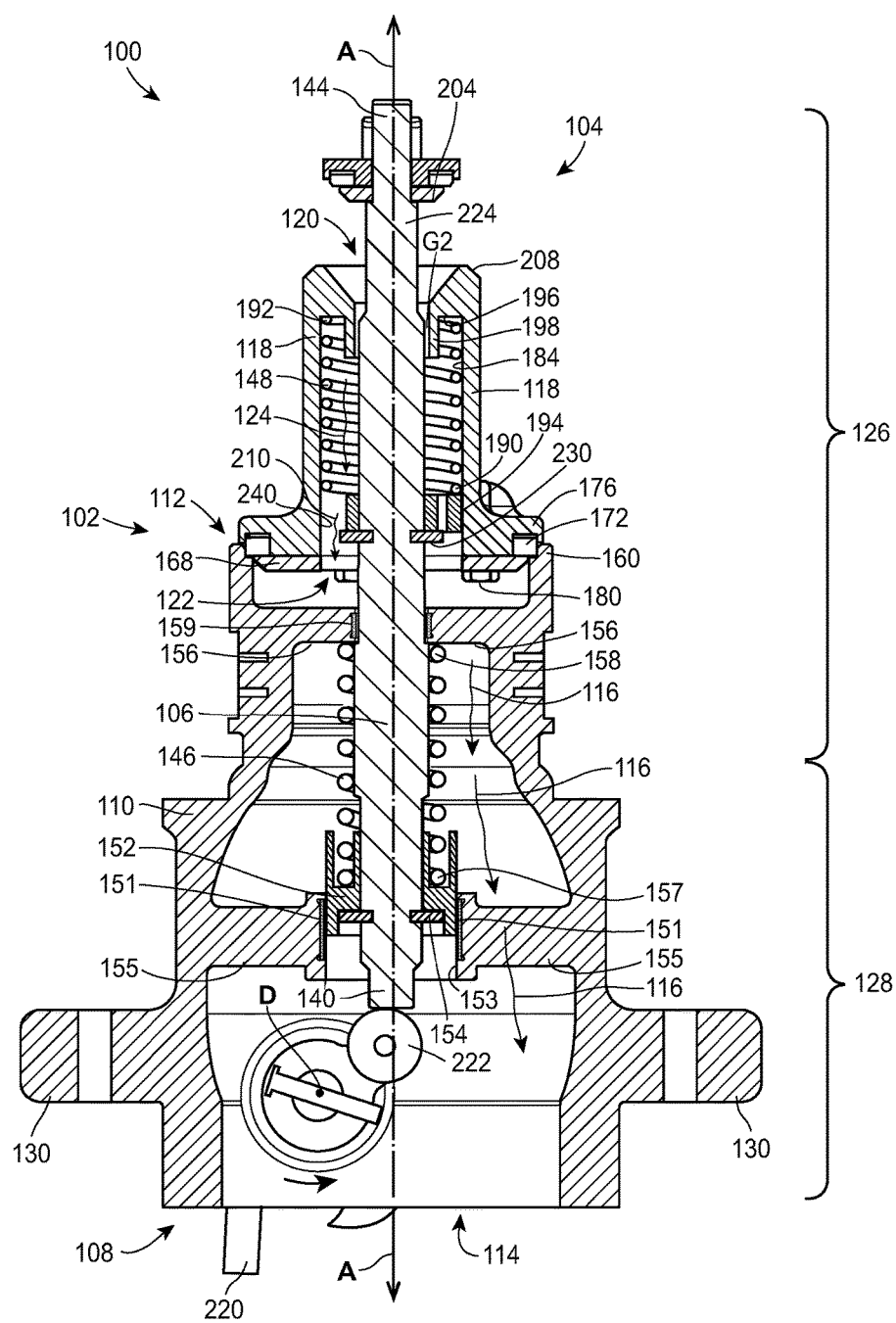
FIG. 9 is a cross-sectional view of the internal valve assembly of FIG. 6 and showing the valve stem in the third position but showing the poppet valve shifted toward the closed position leaving the bleed valve open.

FIG. 8 illustrates the internal valve 100 in the open operating configuration, where the poppet valve 102 is in the open position, permitting fluid to flow from the upstream pressure source into the inlet 112 of the valve 100, into the orifice 164, through the main flow path 116, and out of the valve 100 via the outlet 114. The bleed seat 208 of the bleed valve body 110 meets the bleed disc 204 when the first spring 148 expands in the axial direction and shifts the bleed valve body 118 upward and away from the inlet 112. In response to the pressure differential across the valve 100, the expansion of the first spring 148 causes the second spring seat 194 to slide downward within to the bore 184.

When, however, the upstream pressure overcomes the spring force of the second spring 148, the poppet valve 102 is moved back to the closed position. Alternatively, the flow rate through the valve 100 may exceed a specific or predetermined flow rate, causing the bleed valve body 118 to move toward the valve seat 160 to close the poppet valve 102. In any event, the closing of the poppet valve 102 moves the valve 100 from the open operating configuration illustrated in FIG. 8 to the limited bleed configuration illustrated in FIG. 9. In the limited bleed configuration, the bleed valve 104 is in the open bleed position. The recessed portion 224 of the valve stem 106 is thus placed above the bleed port 200. In this position, the recessed portion 224 is not disposed in the bleed port 200 sufficiently to form gap G1, and instead a gap G2 is defined between the valve stem 106 and the valve port 200. Gap G2 is smaller than gap G1 formed by the recessed portion 224 of the valve stem 106 and the valve port 200 in the jet bleed configuration. The formation of gap G2 permits a limited amount of fluid to bleed through the bleed port 200 relative to the amount of fluid that is permitted to bleed through the bleed port 200 in the jet bleed configuration.

According to the teachings of the present disclosure, the bleed valve 104 and the poppet valve 102 provide an excess flow functionality that maintains system safety and permits the bleed valve 104 and the poppet valve 102 to open and close, as illustrated in FIGS. 2-5. The excess flow function protects the system by automatically restricting fluid flow into the inlet 112 when a flow rate becomes too high within the valve 100. In particular, the poppet valve 102 operates based on a pressure differential between the inlet pressure and the outlet pressure, and the first spring 148 has an excess flow spring rate that causes the bleed valve body 118 and the valve disc 168 to move toward the seating surface 160 when the flow rate through the valve 100 exceeds a specific or predetermined flow rate. When the inlet pressure is substantially greater than the outlet pressure, the bleed valve body 118 carrying the valve disc 168 remains biased toward the seating surface 160 in the closed configuration depicted in FIG. 6. The bleed valve 104 is arranged to equalize or balance the pressure between the inlet 112 and outlet 114, and the bleed valve 104 may place the valve 100 in the jet bleed configuration shown in FIG. 8 to allow a certain amount of fluid to bleed into the internal valve 100. When the inlet pressure is approximately equal to the outlet pressure, the first spring 148 opens the poppet valve 102 to allow fluid to flow through the internal valve 100 as shown in FIG. 8. Once the poppet valve 102 opens, a fluid flow greater than the spring rate of the first spring 148 may force the poppet valve 102 to close against the first spring 148 shown in FIG. 9. In the limited bleed configuration, the bleed valve 104 is opened to permit a smaller amount of fluid to bleed into valve 100.

The invention claimed is:

1. A valve body for an internal valve for use with a fluid container, the fluid container having an opening surrounded by a mounting flange, the valve body comprising:
an upper portion having a diameter and sized to extend through the opening in the fluid container;
an inlet and an outlet;
a flange arranged to permit the valve body to be mounted to the mounting flange of the container via flange fasteners;
a primary stem guide supported by primary stem struts connected to an inner side of the valve body at a first axial location along an axis of the valve body, and
a secondary stem guide supported by secondary stem struts connected to the inner side of the valve body at a second axial location along the axis of the valve body that is an axial distance from the first axial location,
wherein the valve body further includes thickened portions extending inwardly toward the axis of the valve body, each of the secondary stem struts connected to one of the thickened portions,
wherein the thickened portions curve relative to the axis of the valve body, and
wherein the thickened portions curve in a convex shape toward the axis of the valve body.

2. The valve body of claim 1, wherein the secondary stem struts comprise a pair of secondary stem struts, wherein the secondary stem struts are arranged on opposite sides of the secondary stem guide, and wherein the secondary stem struts are inclined.

3. The valve body of claim 1, wherein the secondary stem struts incline upward from the second axial location.

4. The valve body of claim 1, wherein the secondary stem struts incline downward from the second axial location.

5. The valve body of claim 1, wherein an outer side of the valve body comprises at least one mounting area for mounting a strainer.

6. The valve body of claim 5, wherein each mounting area includes a recessed portion and at least one threaded hole, and wherein the at least one threaded hole extends into one of the thickened portions.

7. The valve body of claim 6, wherein the diameter of the upper portion of the valve body is smaller than a diameter of the opening of the fluid container, thereby forming a clearance space between the upper portion and the opening of the fluid container, the clearance space having a width relative to the upper portion of the valve body and the opening of the fluid container, and wherein the at least one threaded hole has a depth that is greater than the width of the clearance space.

8. The valve body of claim 7, wherein the depth of the threaded hole is at least four times greater than the width of the clearance space.

9. An internal valve for connection to a fluid container, the fluid container having an opening surrounded by a mounting flange, the internal valve comprising:
a valve body having an upper portion having a diameter and sized to extend through the opening in the fluid container, the valve body including an inlet and an outlet;
the valve body including a flange arranged to permit the valve body to be mounted to the mounting flange of the container via flange fasteners;
a valve stem slidably disposed in the valve body;
a primary stem guide supported by primary stem struts connected to an inner side of the valve body at a first axial location along an axis of the valve body, and
a secondary stem guide supported by secondary stem struts connected to the inner side of the valve body at a second axial location along the axis of the valve body that is an axial distance from the first axial location,
a poppet valve including a poppet body, the poppet body operatively coupled to the valve stem by a first spring and including a poppet inlet and a poppet outlet, the poppet valve arranged to open and close the inlet of the valve body;
a bleed valve operatively coupled to the valve stem and arranged to open and close the poppet inlet;
wherein the valve body further includes thickened portions extending inwardly toward the axis of the valve body, each of the secondary stem struts connected to one of the thickened portions,
wherein the thickened portions curve relative to the axis of the valve body, and
wherein the thickened portions curve in a convex shape toward the axis of the valve body.

10. The internal valve of claim 9, wherein the secondary stem-struts comprise a pair of secondary stem struts, wherein the secondary stem struts are arranged on opposite sides of the secondary stem guide, and wherein the secondary stem struts are inclined.

11. The internal valve of claim 9, wherein the secondary stem struts incline upward from the second axial location.

12. The internal valve of claim 9, wherein the secondary stem struts incline downward from the second axial location.

13. The internal valve of claim 9, wherein an outer side of the valve body comprises at least one mounting area.

14. The internal valve of claim 13, wherein each of the at least one mounting areas includes a recessed portion and at least one threaded hole, and wherein the at least one threaded hole extends into one of the thickened portions.

15. The internal valve of claim 13, wherein the diameter of the upper portion of the valve body is smaller than a diameter of the opening of the fluid container, thereby forming a clearance space between the upper portion of the valve body and the opening of the fluid container, the clearance space having a width relative to the upper portion of the valve body and the opening of the fluid container, and including a strainer sized to surround at least a portion of the poppet valve and the bleed valve, the strainer including an extended portion sized to be positioned in the clearance space and arranged for securement to one of the at least one mounting area by at least one fastener.

16. The internal valve of claim 15, wherein each of the at least one fastener has a length, and wherein the length of each of the at least one fastener is greater than the width of the clearance space.

17. The internal valve of claim 16, wherein the length of the at least one fastener is at least four times greater than the width of the clearance space.

18. A valve body for an internal valve for use with a fluid container, the fluid container having an opening surrounded by a mounting flange, the valve body comprising:
   an upper portion having a diameter and sized to extend through the opening in the fluid container;
   an inlet and an outlet;
   a flange arranged to permit the valve body to be mounted to the mounting flange of the container via flange fasteners;
   a primary stem guide supported by primary stem struts connected to an inner side of the valve body at a first axial location along an axis of the valve body, and
   a secondary stem guide supported by secondary stem struts connected to the inner side of the valve body at a second axial location along the axis of the valve body that is an axial distance from the first axial location,
   wherein the valve body further includes thickened portions extending inwardly toward the axis of the valve body, each of the secondary stem struts connected to one of the thickened portions,
   wherein the thickened portions curve relative to the axis of the valve body,
   wherein an outer side of the valve body comprises at least one mounting area for mounting a strainer, and
   wherein each mounting area includes a recessed portion and at least one threaded hole, and wherein the at least one threaded hole extends into one of the thickened portions.

19. The valve body of claim 18, wherein the diameter of the upper portion of the valve body is smaller than a diameter of the opening of the fluid container, thereby forming a clearance space between the upper portion and the opening of the fluid container, the clearance space having a width relative to the upper portion of the valve body and the opening of the fluid container, and wherein the at least one threaded hole has a depth that is greater than the width of the clearance space.

20. An internal valve for connection to a fluid container, the fluid container having an opening surrounded by a mounting flange, the internal valve comprising:
   a valve body having an upper portion having a diameter and sized to extend through the opening in the fluid container, the valve body including an inlet and an outlet;
   the valve body including a flange arranged to permit the valve body to be mounted to the mounting flange of the container via flange fasteners;
   a valve stem slidably disposed in the valve body;
   a primary stem guide supported by primary stem struts connected to an inner side of the valve body at a first axial location along an axis of the valve body, and
   a secondary stem guide supported by secondary stem struts connected to the inner side of the valve body at a second axial location along the axis of the valve body that is an axial distance from the first axial location,
   a poppet valve including a poppet body, the poppet body operatively coupled to the valve stem by a first spring and including a poppet inlet and a poppet outlet, the poppet valve arranged to open and close the inlet of the valve body;
   a bleed valve operatively coupled to the valve stem and arranged to open and close the poppet inlet;
   wherein the valve body further includes thickened portions extending inwardly toward the axis of the valve body, each of the secondary stem struts connected to one of the thickened portions,
   wherein the thickened portions curve relative to the axis of the valve body,
   wherein an outer side of the valve body comprises at least one mounting area, and
   wherein each of the at least one mounting areas includes a recessed portion and at least one threaded hole, and wherein the at least one threaded hole extends into one of the thickened portions.

21. The internal valve of claim 20, wherein the diameter of the upper portion of the valve body is smaller than a diameter of the opening of the fluid container, thereby forming a clearance space between the upper portion of the valve body and the opening of the fluid container, the clearance space having a width relative to the upper portion of the valve body and the opening of the fluid container, and including a strainer sized to surround at least a portion of the poppet valve and the bleed valve, the strainer including an extended portion sized to be positioned in the clearance space and arranged for securement to one of the at least one mounting area by at least one fastener.

* * * * *

UNITED STATES PATENT AND TRADEMARK OFFICE
CERTIFICATE OF CORRECTION

PATENT NO.        : 10,295,081 B2                        Page 1 of 1
APPLICATION NO.   : 15/635914
DATED             : May 21, 2019
INVENTOR(S)       : Feifei Ji et al.

It is certified that error appears in the above-identified patent and that said Letters Patent is hereby corrected as shown below:

In the Specification

At Column 6, Line 7, "Each" should be -- each --.

At Column 10, Line 9, "first spring 146" should be -- second spring 146 --.

At Column 10, Line 51, "second spring 148," should be -- first spring 148, --.

Signed and Sealed this
Tenth Day of November, 2020

Andrei Iancu
*Director of the United States Patent and Trademark Office*